May 5, 1970  G. BOBST  3,510,231
CONTROL APPARATUS FOR ADJUSTING THE STROKE VOLUME
OF A HYDRAULIC PUMP
Filed June 21, 1968  7 Sheets-Sheet 1

INVENTOR

GERHARD BOBST

BY Jacobi & Davidson

ATTORNEYS

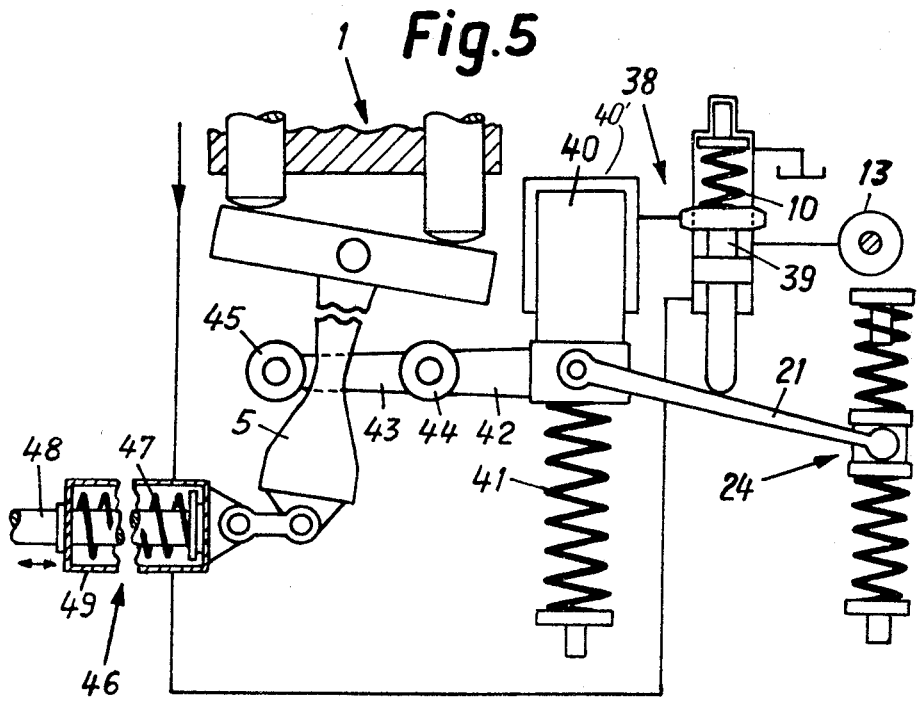
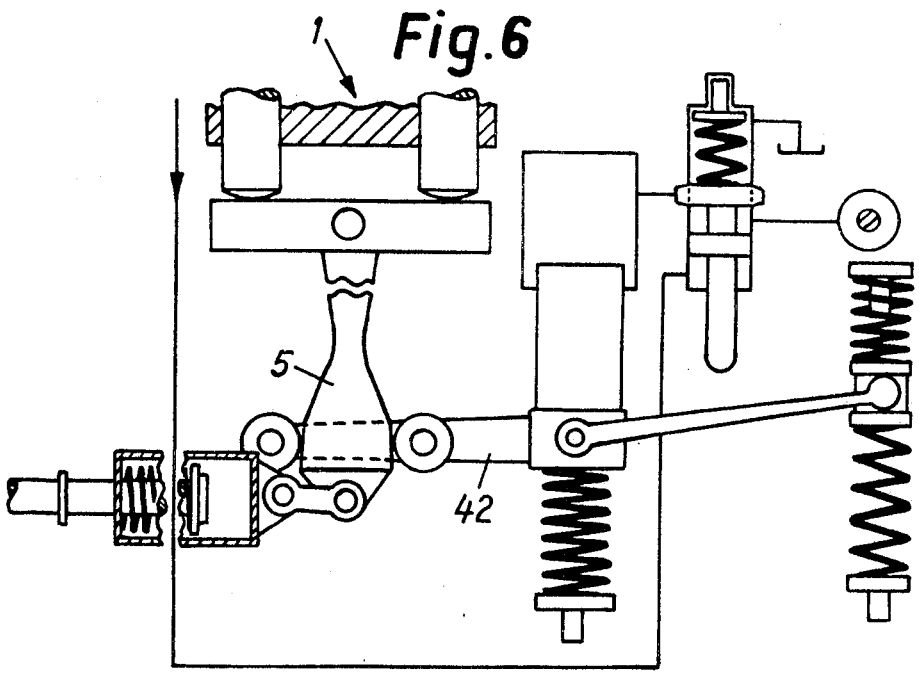

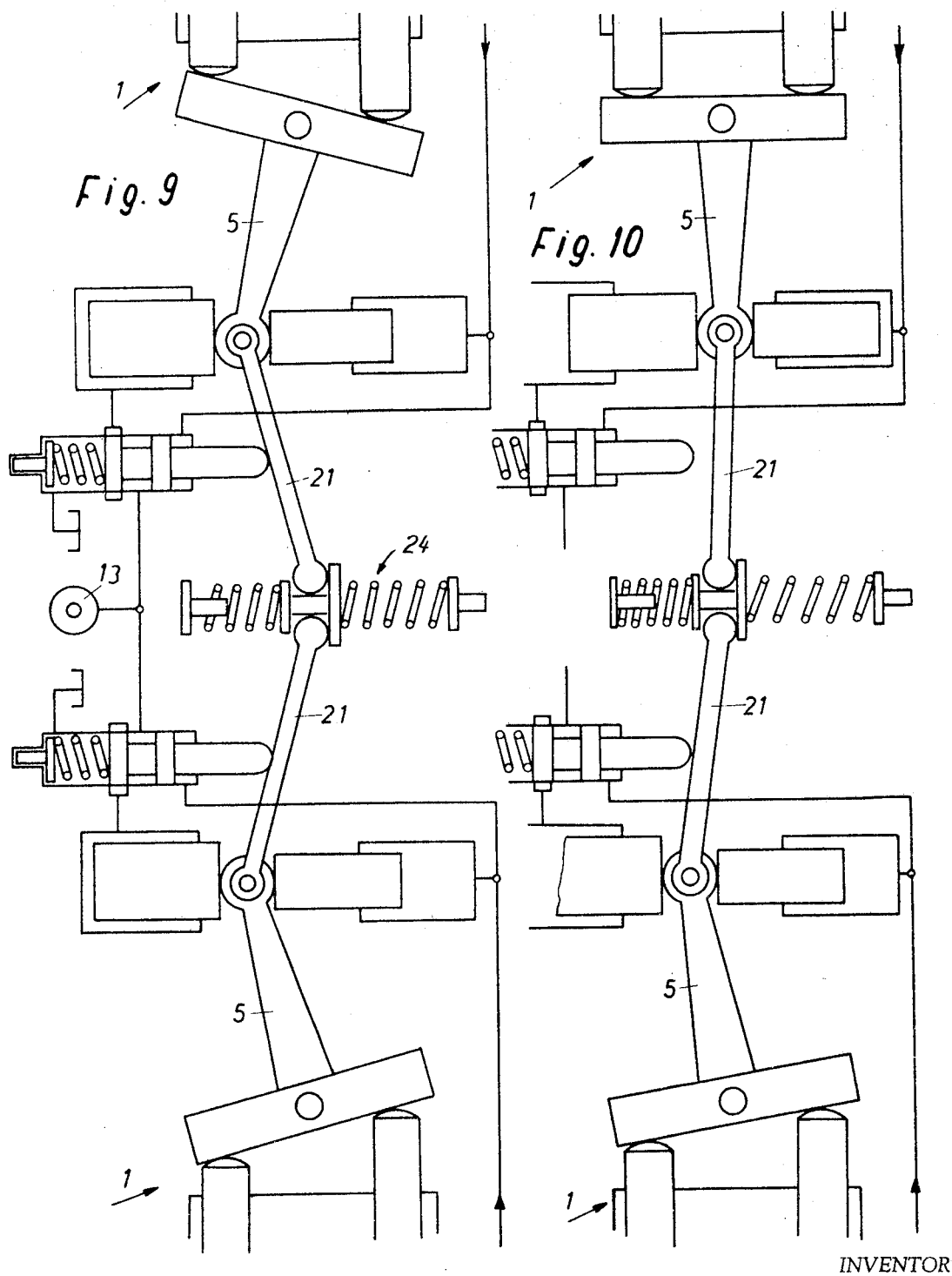

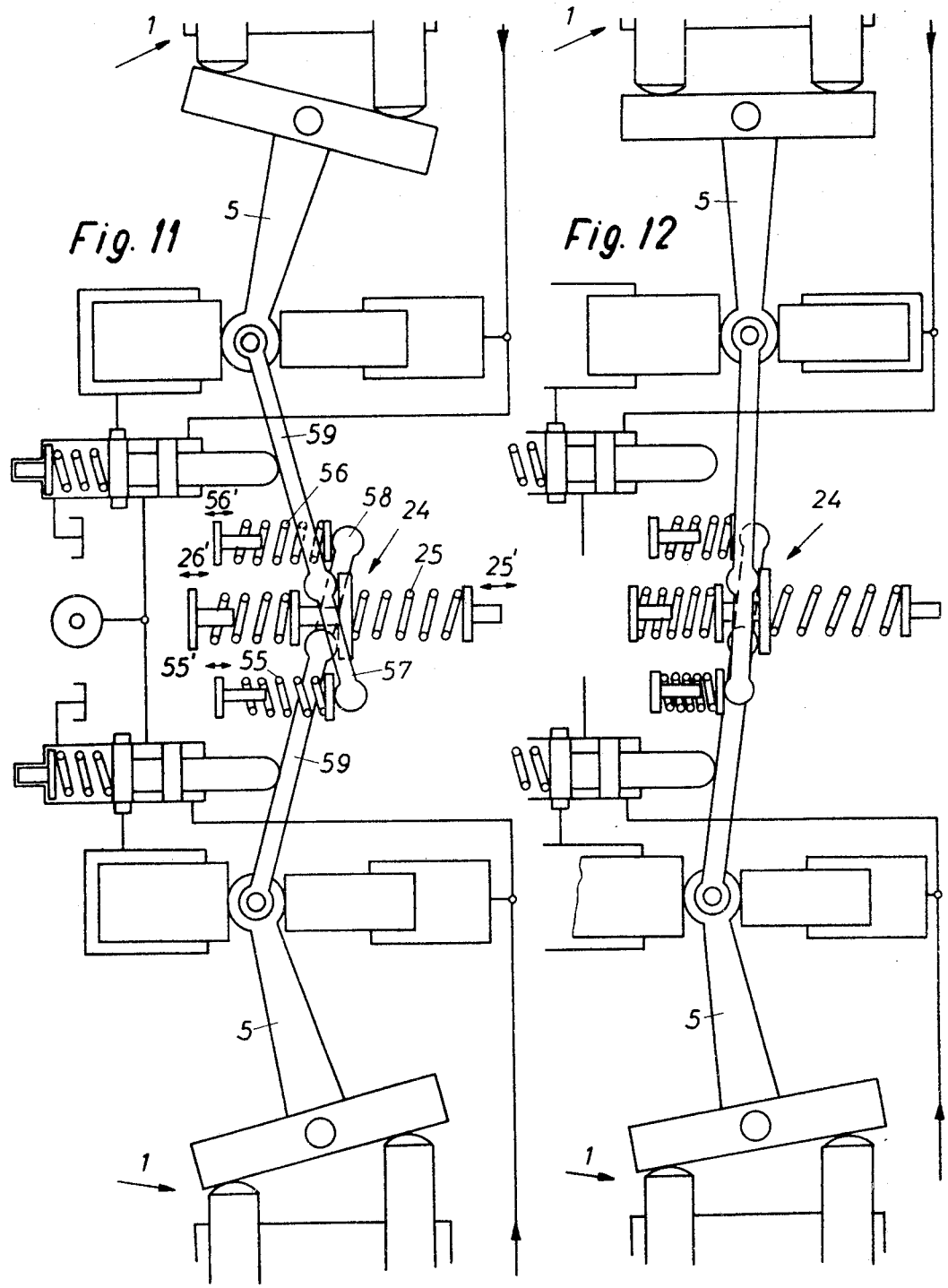

United States Patent Office 3,510,231
Patented May 5, 1970

3,510,231
CONTROL APPARATUS FOR ADJUSTING THE STROKE VOLUME OF A HYDRAULIC PUMP
Gerhard Bobst, Oensingen, Switzerland, assignor to Von Roll AG, Gerlafingen, Switzerland, a corporation of Switzerland
Continuation-in-part of application Ser. No. 574,240, Aug. 22, 1966. This application June 21, 1968, Ser. No. 738,913
Claims priority, application Switzerland, Aug. 27, 1965, 12,088/65; June 14, 1968, 8,851/68
Int. Cl. F04b *1/02, 49/00;* F04d *15/00*
U.S. Cl. 417—218                8 Claims

ABSTRACT OF THE DISCLOSURE

A control apparatus for adjusting the stroke volume of at least one hydraulic unit as a function of the operating pressure. This control apparatus comprises pre-control means which incorporate a pre-control valve unit impinged by the measurement pressure and a first adjustable spring system. Servo means cooperate with the pre-control means, such servo means incorporating at least one servo piston unit impacted by a regulated or dosed quantity of pressurized fluid medium delivered from the pre-control valve unit. The servo piston unit actuates an adjustment element provided for the hydraulic unit. Additionally, a second adjustable spring system acts upon the pre-control means and the operation of which is influenced by the position of the servo means. Also, at least one connecting element is actuated by such servo means. The second adjustable spring system acts upon the pre-control piston means of the pre-control valve unit against the action of the force of the first spring system and through the agency of the connecting element actuated by the servo means.

BACKGROUND OF THE INVENTION

The present application is a continuation-in-part application, of my commonly assigned, copending United States application, Ser. No. 574,240, filed Aug. 22, 1966, now Pat. No. 3,403,628, dated Oct. 1, 1969, and entitled "Hydraulic Control Apparatus."

The present invention relates to an improved control or regulating apparatus for adjusting the stroke volume of a hydraulic pump or the like as a function of the operating pressure. The inventive control apparatus embodies a pre-control component consisting of a pre-control valve impinged by the measurement pressure and a first adjustable spring system. It further incorporates a controlled or servo component composed of at least one servo piston impinged by pressurized oil which is dosed by the pre-control valve and which actuates an adjustment member for the hydraulic pump. Additionally, the inventive apparatus embodies a second adjustable spring system which acts upon the pre-control component and which influences its operation as a function of the position of the servo component.

Control devices of the aforementioned type are known in a number of different structural manifestations. The primary defect of the known embodiments resides in the fact that their accommodation to different operating conditions, which always requires a change in the dependency of the stroke volume of the hydraulic pump with regard to the operating pressure, causes considerable difficulties. This is so because the servo component which actuates the adjustment element of the hydraulic pump, generally requires a return for influencing the pre-control component as a function of the position of the servo piston. Consequently, the result is narrow or small space conditions if the constructional size of the control device is not carried out to encompass dimensions which render manufacture thereof uneconomical. These small space conditions inherently cause a limited adjustment possibility for the individual elements.

SUMMARY OF THE INVENTION

Accordingly, it is a primary object of the present invention to effectively overcome the aforementioned drawbacks of the prior art structures.

Another, more specific object of the present invention relates to the provision of an improved control apparatus which allows for an exceptionally great accommodation possibility of the control apparatus to the different operating conditions, without requiring a greater constructional expenditure.

Now, in order to implement these and still further objects of the present invention, which will become more readily apparent as the description proceeds, the inventive control apparatus is generally manifested by the features that the second adjustable spring system acts upon the pre-control piston through the agency of a connection element actuated by the servo component and against the application of force of the first spring system.

BRIEF DESCRIPTION OF THE DRAWINGS

The invention will be better understood, and objects other than those set forth above, will become apparent, when consideration is given to the following detailed description thereof. Such description makes reference to the annexed drawings wherein the same reference numerals have been employed for the same or analogous elements and wherein:

FIG. 5 illustrates a third embodiment of control apparatus in which the regulation or control device only adjusts the adjustment element when exceeding a threshold adjustment;

FIG. 6 illustrates the control apparatus of FIG. 5, but with a small stroke volume of the hydraulic pump;

FIG. 9 is a fifth embodiment of control apparatus for a number of hydraulic pumps while utilizing a common second spring system;

FIG. 10 illustrates the control apparatus of FIG. 9 with a hydraulic pump for small stroke volume;

FIG. 11 is a sixth emodiment of control apparatus for adjusting a number of hydraulic pumps while utilizing a common second spring system;

FIG. 12 depicts the control apparatus according to FIG. 11 with a hydraulic pump with small stroke volume.

DESCRIPTION OF THE PREFERRED EMBODIMENTS

Figure 1:
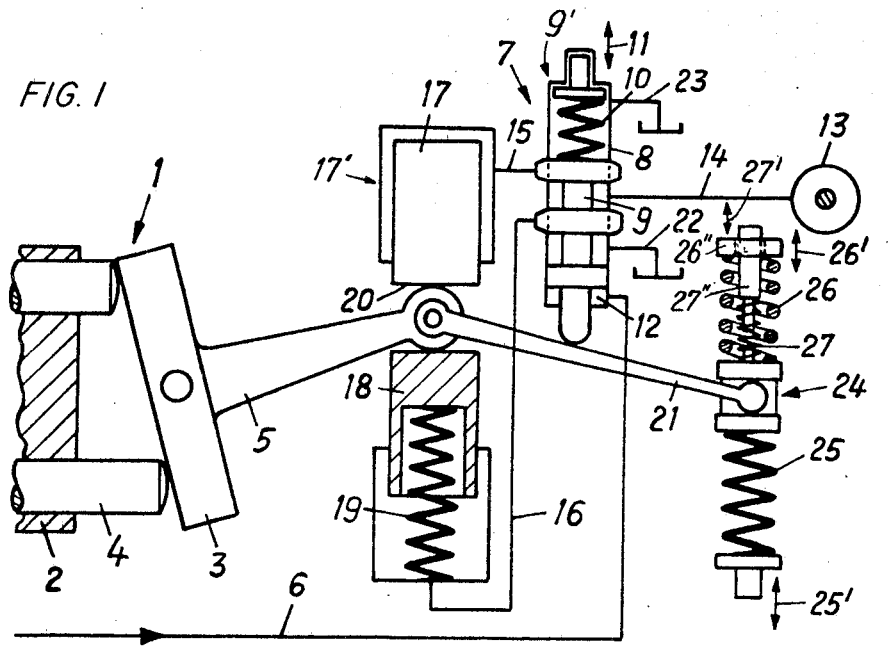
FIG. 1 illustrates a first embodiment of inventive control apparatus for large stroke volume of the hydraulic pump.

Describing now the drawings, it should be understood that reference numeral 1 general designates the entire schematically illustrated hydraulic unit. It should be further understood that this hydraulic unit 1 can be a hydraulic pump or a hydraulic motor. Hence, the term hydraulic pump as used herein is employed in its broadest sense to encompass both possibilities.

Thus, for instance, the hydraulic unit 1, in the exemplary embodiments, may be considered to be an axial piston unit having a rotating cylinder 2 and a pivotable inclined plate 3, sometimes referred to as a swash or wobble plate, against which bear the piston members 4 located in the rotating cylinder 2. The utility of the present invention is, however, not limited to just such type units. It can be employed wherever adjustment units are utilized and which exhibit an adjustment lever at which there is exerted in suitable manner a force for adjusting the stroke volume of the unit. In the various figures this adjustment lever is designated by reference numeral 5. By way of simplification, in the further description of the invention the hydraulic unit 1 will always be referred to a pump, the stroke volume of which is adjusted by the adjustment member 5.

Continuing, it should be recognized that reference numeral 6 designates a pressure conduit or line by means of which the operating pressure of the pump 1 is delivered to the control apparatus, designated in its entirety by reference numeral 7. The control apparatus 7 is composed of a pre-control component or means which consists of a pre-control piston 9 of a pre-control valve unit 9' displaceable in a cylinder 8, and further, incorporates a first spring system 10 which can be adjusted or regulated in the direction of the double-headed arrow 11. The first spring spring system 10 which is depicted in FIG. 1 as a single spring member can also be composed of different spring members which act in axial direction upon the pre-control piston 9. The operating pressure of the fluid medium entering through the conduit 6 arrives at the compartment 12 of the pre-control valve unit 9' and impacts against the pre-control piston 9 against the direction of the applied force of the spring system 10. A separate source of pressurized oil, serving as the fluid medium, delivers such pressuized oil via the conduit 14 to the pre-control valve unit 9'. The latter then delivers this pressurized oil via the conduits 15 and 16 to the servo means 17' which is composed of both of the oppositely working piston members 17 and 18, and auxiliary spring member 19 and a support 20 for the adjustment element 5 and the connection element 21.

Now, if the pre-control piston 9 moves upwards, then, the conduit 15 is supplied with pressurized oil through the agency of the conduit 14, whereas the conduit 16 communicates with the discharge via the conduit 22. As a result, there occurs an adjustment of the adjusting element 5 in the sense of a reduction of the stroke volume of the pump 1. If the pre-control piston 9 moves in the opposite direction, then the conduit 15 is connected with the discharge by means of the conduit 23, whereas the conduit 16 receives pressurized oil via the conduit 14. The auxiliary spring member 19 essentially provides for a proper bearing of the individual components without play.

A second spring system 24 which acts upon the other end of the connecting or connection element 21 is composed of partially oppositely acting spring members 25, 26 and 27, wherein spring member 25 acts upwardly and is adjustable in the direction of the double-headed arrow 25', whereas spring member 26 and spring member 27 act downwardly and their adjustability is indicated by the double-headed arrows 26' and 27', respectively. In FIG. 1 a certain amount of play exists between the spring members 26 and 27 with respect to their adjustable impact members 26'' and 27'', in other words both of the spring members 26 and 27 are without effect in this position. Thus, only the spring force of the spring member 25 acts upon the adjustment lever and presses the connecting element 21 against the pre-control piston 9. The equilibrium and therefore the central position of the pre-control piston 9 then occurs when the force of the first spring system 10 equals the force of the operating pressure in the compartment 12 acting upon the pre-control piston 9 in addition to the force of the spring 25, while taking into account the transmission ratio appearing at the connection element 21.

Figure 2:
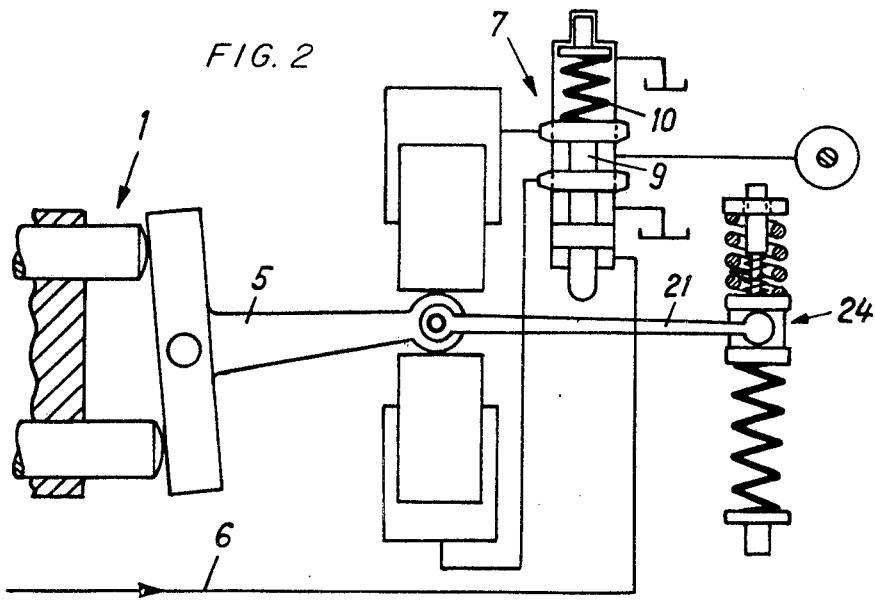
FIG. 2 illustrates the control apparatus of FIG. 1 with small stroke volume of the hydraulic pump.

FIG. 2 illustrates the position of the pump 1 when operating with a small stroke volume. This position occurs, for instance, during the maximum possible operating pressure of the pump 1. In this case, then, the connecting element 21 is not in operable association with the pre-control piston 9, so that also the second spring system 24 is not effective. The condition of equilibrium at the pre-control piston 9 is provided by the first spring system 10 and the operating pressure acting in the compartment 12. It will be easily recognized that in this instance one is concerned with a control or regulation for constant pressure, since the force equilibrium at the pre-control piston 9 is not influenced by the stroke pistons of the pump unit 1.

Figure 3:
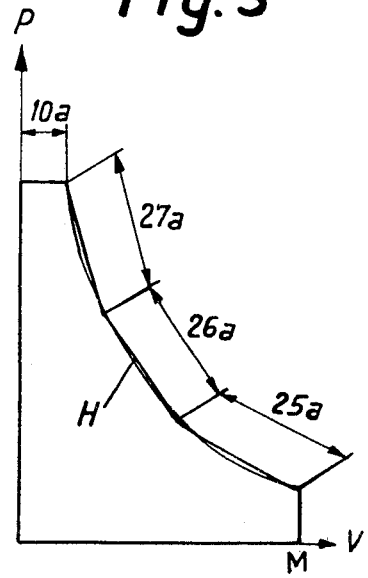
FIG. 3 graphically illustrates the pressure-stroke volume relationship which is adjustable by means of the control apparatus of FIGS. 1 and 2.

In FIG. 3 there is illustrated the action of the different spring systems 10 and 24. In the graph of this figure there is plotted along the ordinate the operating pressure P and along the abscissa the stroke volume V. In this instance one is concerned with a control for constant output, in which the product $P \times V =$ constant. During the adjustment of the stroke volume the first spring system 10 is always effective. The region $25a$ appearing in FIG. 3 represents the position of the control apparatus when only the spring 25 of the second spring system 24 is effective. With increasing operating pressure the support means 20 for the adjustment element 5 and the connection element 21 is lowered, whereby the stroke volume is reduced. At the region or section $26a$ the spring member 26 also becomes effective. Since this spring member 26 acts against the spring 25, the effect of the latter spring member at the pre-control piston 9 is reduced. Consequently, there is obtained a steeper pressure-stroke volume characteristic. At the region $27a$ the spring member 27 is also effective and brings about an even steeper pressure-stroke volume characteristic. At the region $10a$ only the first spring system is effective, that is to say, the control device 7 assumes the position depicted in FIG. 2, whereby this control device 7 regulates the stroke volume of the pump 1 for constant pressure, such pressure generally corresponds to the maximum permissible operating pressure, whereas the point M corresponds to the maximum stroke volume of the pump 1.

The control device 7 depicted in FIG. 1 operates solely with cylinder springs. Nonetheless, it is therefore possible to achieve a very good approximation to the output hyperbola H of FIG. 3. Actually, this approximation or coincidence is even greater since between the transition from one region to the neighboring region there is not a sudden transition, as is thought of in theory, rather a gradual transition occurs in practice. Moreover, in a completely similar simple manner it is possible to adjust for other pressure-stroke volume characteristics, and for which purpose there are employed the adjustment possibilities, generally designated by reference characters 11, 25', 26' and 27'. However, it would also be possible to easily exchange the spring members. The employed spring members can be of relatively small size since the pre-control valve unit 9' is likewise of small dimension because of the relatively small quantity of oil which is to be regulated.

Figure 4:
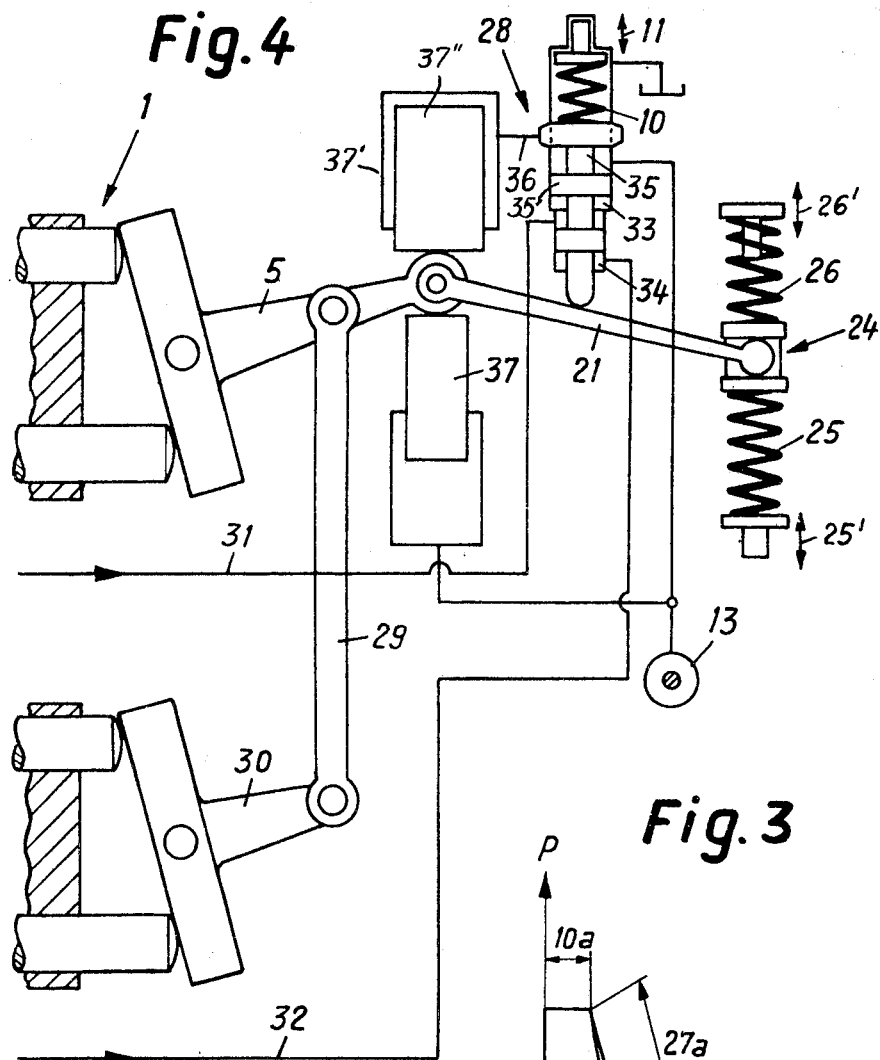
FIG. 4 is a further embodiment of the control apparatus for the regulation of a number of independent pressure systems.

FIG. 4 depicts an embodiment of control apparatus 28 which adjusts two pumps 1, 1, whereby the first pump 1, appearing at the top of FIG. 4, adjusts by means of the adjustment element 5 via a connecting rod 29, the adjustment lever 30 of the second pump 1 appearing at the bottom of FIG. 4. Both of these pumps 1, 1 are operably associated with a respective independent presure system, the operating pressure of which is delivered via the conduits 31 and 32 to the associated compartments 33 and 34, respectively, of the pre-control valve unit 35 incorporating the pre-control piston 35'. The oil pressure acting upon the first spring system 10 is thus composed of the operating pressure of both pressure systems. The remaining construction of the control apparatus of this embodiment is essentially similar to that shown in FIG. 1. Also, the function is the same. In this respect, it is also without significance that the servo means 37' employs pistons 37 and 37" of unequal size and that the precontrol valve unit 35 only controls one conduit or pipe 36, whereas the smaller piston 37 of the servo means 37' is impinged by the pressure source 13. Naturally, instead of an independent pressure source, in all of the embodiments here shown, the pressure could be delivered from a pressure system of a pump. This question is, however, not of a basic nature, since the operation of the control device is not affected. For reasons of simplicity, in the second spring system 24 only two spring members 25 and 26 are illustrated. However, also in this case these spring members 25, 26 can be replaced and adjusted in a number of optional ways. A disadvantage of the present control device resides in the fact that the terminal pressure corresponding to the adjustment of the first spring system 10, that is to say, the maximum permissible pressure of both pump systems during nonfunctioning of the second spring system 24 (FIG. 2), can only then be maintained when both systems simultaneously reach their maximum operating pressure.

In the embodiment according to FIGS. 5 and 6 a positive connection does not exist between the adjustment element 5 of the pump and the control device or apparatus 38. In this case, the control device 38 only adjusts or regulates a boundary or threshold value of the stroke volume which is dependent upon the pressure and which the pump 1 cannot exceed. This control device 38 is composed of the pre-control component incorporating the first spring system 10 and the pre-control piston 39. Additionally, it incorporates the second spring system 24, and the servo means 40' consisting of the servo piston 40 and the counter-spring 41, as well as the connecting element 21, which, on the one hand, partakes in the movements of the servo means 40' and, on the other hand, transmits the spring force of the second spring system 24 to the pre-control piston 39. It will also be recognized that a guide arm 42 is fixedly connected with the servo piston 40. This guide arm 42 possesses a substantially ring-shaped or annular opening 43 provided with the stop or impact members 44 and 45. The adjustment element 5 engages in this ring-shaped opening 43. Moreover, such adjustment element 5 can be adjusted within the path bounded or limited by the impact or stop members 44 and 45, through the agency of an adjustment device, generally designated by reference numeral 46. This adjustment device 46 incorporates a resilient element, here shown to comprise a spring member 47, by means of which the force from the shaft 48 is transmitted to the housing 49. If the adjustment device 46 is in a position, which does not correspond to the pressure in the pressure system of the pump, then the adjustment element 5 will be brought into the proper position by the action of the impact members 44 and 45 of the arm member 42, whereby, as shown in FIG. 6, the spring member 47 comes into operation as a flexible or resilient element.

It should be understood that the embodiment of control device depicted in FIGS. 5 and 6 functions in the same manner as the previously described embodiments, even though the servo means 40' consists of a single servo piston 40 and a counterspring 41. The first spring system 10 and the second spring system 24 together with the connecting element 21, render possible the same multiple adjustment possibilities, as such has already been described in connection with the embodiments of FIGS. 1 and 2. The regulation of the pump 1 within a certain boundary or threshold value, which is possible with this embodiment, can be of importance for certain applications where specifically a predetermined output should not be exceeded, but where, however, such can be optionally, for instance manually changed within the range determined by the boundary value.

Figure 7:
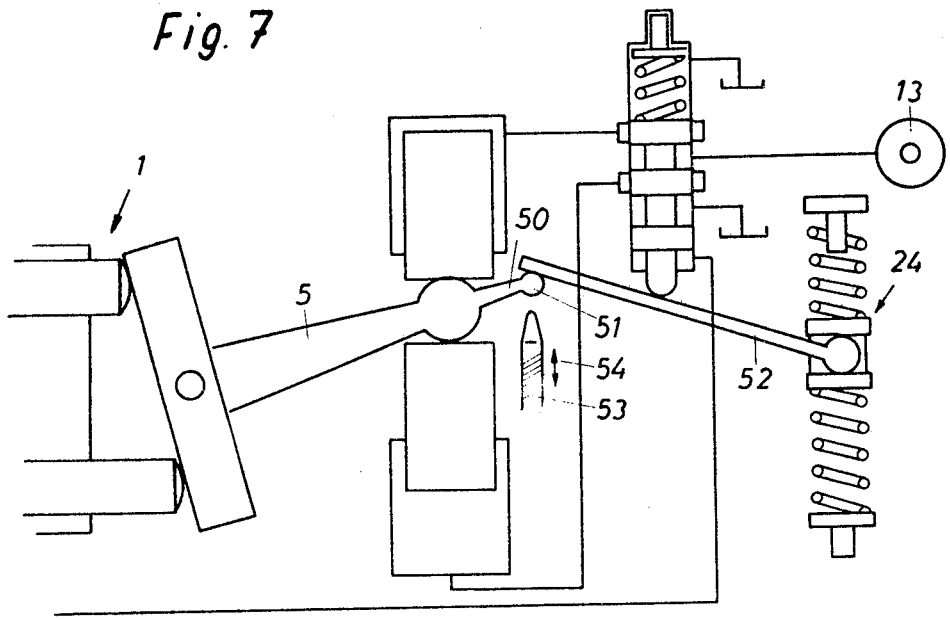
FIG. 7 is a fourth embodiment of the control apparatus for large stroke volume of the hydraulic pump.
Figure 8:
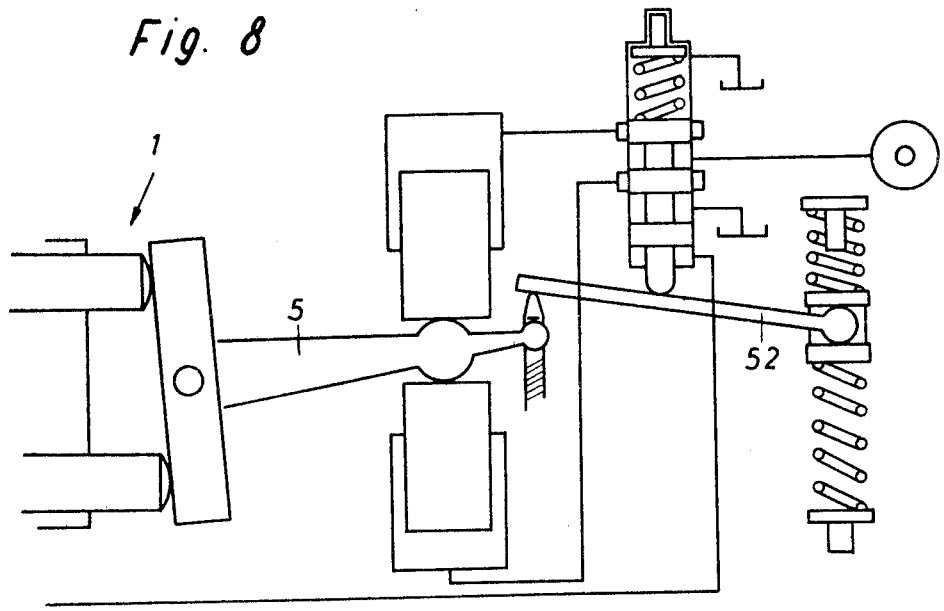
FIG. 8 depicts the control apparatus of FIG. 7 for small stroke volume of the hydraulic pump.

In the embodiment, according to FIGS. 7 and 8, the adjustment lever 5 is provided with an extension 50 having a support or bearing region 51. The connecting or connection element 52, on the one hand, bears upon the support or bearing region 51 and, on the other hand, at the second spring system 24. An elevationally displaceable support 53, movable in the direction of the double-headed arrow 54, cooperates with the connecting element 52. Due to this arrangement, it is possible to variably adjust the maximum permissible operating pressure, that is to say, the region designated in FIG. 3 by reference character 10a can thus be changed in its height. The remaining components of the control device correspond to the embodiments already considered and described previously. By means of the embodiment according to FIGS. 7 and 8, it is indicated that it is possible to additionally influence the pressure-stroke volume characteristic with small changes which do not require any reconstruction of the control device.

In the embodiment according to FIGS. 9 and 10 there is illustrated a control device in which a separate control mechanism is operably associated with each pump 1, 1, whereby, however, the second spring system 24 is common to all of the control mechanisms. Also, this embodiment clearly shows the manner in which a control device for each pump can be arranged in a space saving manner, without subjecting the accommodation of the pressure-volume characteristic to considerable limitations. This result is obtained by virtue of the particular arrangement of the second spring system 24 which is not directly influenced by the servo means, rather is acted upon through the agency of a connecting element 21, and furthermore, the spring action of this system is likewise not directly exerted upon the pre-control piston, rather through the agency of the associated connecting element 21. The embodiment of control apparatus shown in FIGS. 9 and 10 is suitable for the adjustment of an independent pressure cutoff for each pump which is connected with the control apparatus, that is to say, it is possible for instance to differently adjust for each pump the region 10a of the pressure-stroke volume characteristic shown in FIG. 3.

FIGS. 11 and 12 depict a further embodiment of inventive control apparatus or device. Here, the pre-control means and the servo means are constructed in the same manner as shown in FIGS. 9 and 10. The difference in structure between the systems resides in the construction of the second spring system 24. Here, additional spring members 55 and 56 are provided for the second spring system 24. These spring members 55 and 56 act upon extensions 57 and 58, respectively, of the connecting rods 59. This modification or arrangement can also be provided quite simply at the basic constructional arrangement of control apparatus shown and described in conjunction with FIGS. 1 and 2, without having to make available a considerably larger space or area, since on account of the connecting element 59 it is possible to maintain a minimum spacing or distance which also permits the installation of additional spring members 55 and 56 without difficulty.

FIGS. 11 and 12 likewise present exemplary embodiments which depict the exceptionally great accommodation possibilities for the control apparatus designed according to the invention for different desired pressure-stroke volume characteristics. Owing to the action of the springs 55 and 56 the effect of the spring member 25 is reduced. This means that the pressure which is available for a certain stroke volume is larger. Thus, if for example, in accordance with FIG. 12, the upper pump 1 must only maintain the pressure for a very small stroke volume, then the resulting required output is exceptionally small. Since the effect of the spring member 25 is weakened, it is then achieved that the output which is not required by the upper pump, is additionally available for the other lower pump.

Furthermore, the embodiment of inventive control apparatus or device shown in FIGS. 11 and 12 represents a suitable example for the accommodation capability of the control device for different desired pressure-stroke volume characteristics, since the second sprng system is easily accessible and possesses sufficient adjustment possibilities. In FIGS. 11 and 12 four adjustment possibilities, represented by reference characters 25', 26', 55' and 56', are available for four springs.

Figure 13:
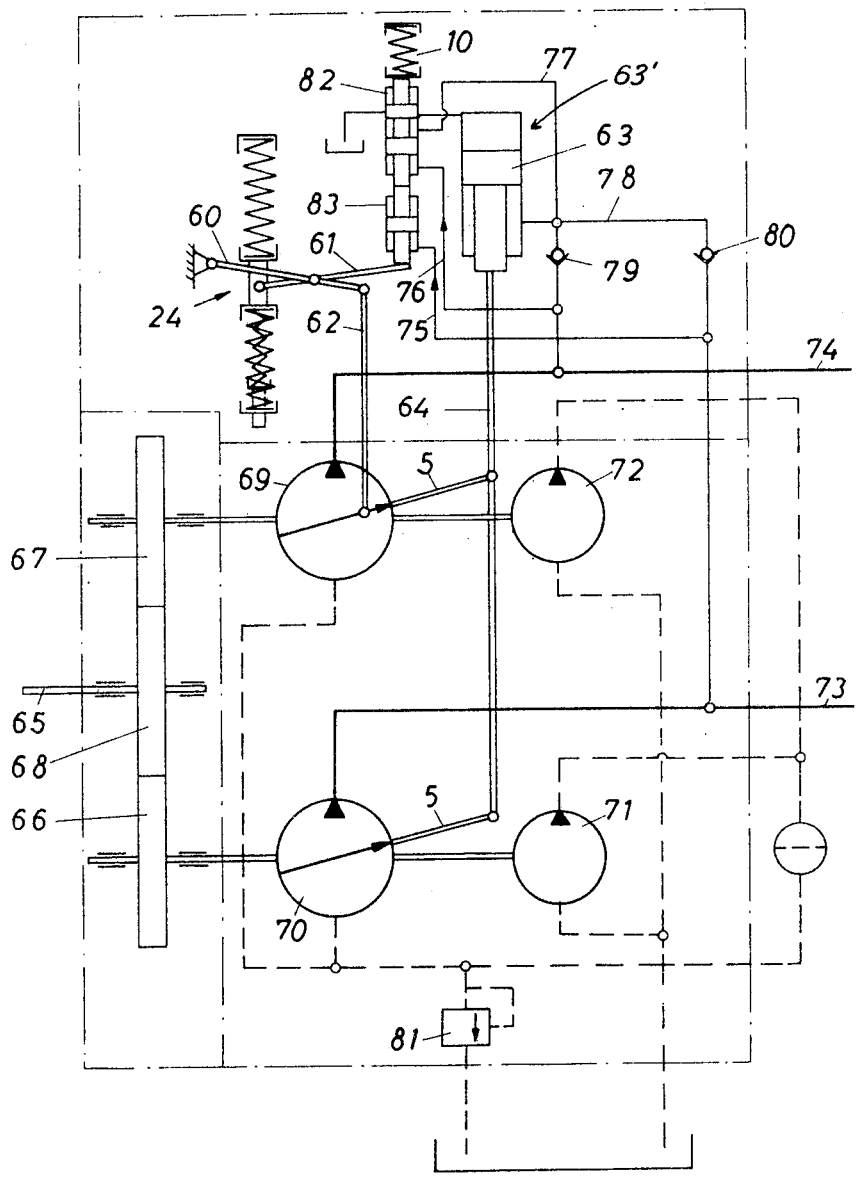
FIG. 13 is a hydraulic circuit diagram of a double-pump regulation.

FIG. 13 is intended to illustrate that in addition to the most different types of design and arrangement of the second spring system a further accommodation possibility of the characteristics can be undertaken if, instead of a single connecting element, there is employed a connecting chain arrangement consisting of pivot joint means and a number of elements. More precisely, in FIG. 13 there are illustrated two such connecting element components 60 and 61. In this instance, the control apparatus is in operable association with a so-called double pump arrangement, that is to say, two pumps for a respective independent closed circuit or circulation system. The dependency of the connecting element chain 60, 61 upon the position of the servo component 63' occurs from the adjustment lever 5 through the agency of the rod member 62, whereas the servo piston 63 is constructed as a differential piston which actuates both of the adjustment levers 5 through the agency of the rod member 64.

The entire installation depicted in FIG. 13 possesses a drive shaft 65, which for instance, is driven by a thermal power machine. By means of a multiple output or branch transmission unit 66, 67, 68, both of the pump units 69 and 70 as well as the supply pumps 71 and 72 coupled with these pumps 69 and 70, as shown, are driven. The pump unit 70 delivers pressurized oil to the conduit 73, whereas the pump unit 69 delivers pressurized oil to the conduit 74. By means of the conduits 75 and 76 the pressure of both fluid circuits is transmitted to the pre-control valve unit 82, 83. The impingement of the servo component 63' occurs in connection with the first and second spring systems 10 and 24. In this embodiment the pressure for the adjustment of the servo component 63' is not received from a special energy source, rather is removed from both of the fluid circulation systems through the agency of the conduits 77, 78, whereby the check valves 79, 80 always bring into play the higher pressure of the relevant fluid circulation system. The supply fluid circuit of both pumps 71 and 72 is maintained by means of an overflow valve 81 at a predetermined pressure value, for instance, of several atmospheres.

Naturally, it is possible to combine with one another individual components of the embodiments depicted in FIGS. 1 to 13. Thus, it is for instance possible to mutually exchange the different servo components. It is, for example, unimportant for the operation of the control apparatus whether there is employed a pre-control valve unit with four control edges and such accordingly impact both sides of the servo component, or whether one pre-control valve having two control edges is employed, whereby the servo component is constructed as a differential piston and only the larger surface of the differential piston is controlled by the pre-control valve unit, whereas the unthrottled control pressure is effective at the smaller piston surface. Furthermore, it is possible to utilize the boundary value regulation taught in the embodiment illustrated in FIGS. 5 and 6 also in conjunction with the embodiments shown in FIGS. 4, 9 and 11, where two and more pumps are commonly regulated by independent pressure systems, whereby also instead of the individual servo piston with counterspring, there can be used a servo means or component of a different embodiment, for instance one formed of two equal size pistons or one employing a differential piston.

Furthermore, the precontrol value unit can be constructed in a number of different ways. Thus, for instance, the embodiment of FIG. 13 shows a construction in which the pre-control valve unit 82, 83 is formed of two components, whereby the measurement pressure of the one system is delivered via the conduit 75 to the component 83 and the other measurement pressure via the conduit 76 to the component 82. By virtue of this arrangement it is possible to prevent the use of pre-control valve units which have stepped diameters, as such is shown in the arrangement of FIG. 3, since such a construction of this particular component is somewhat more difficult to carry out.

It should be apparent from the foregoing detailed description, that the objects set forth at the outset to the specification have been successfully achieved.

What is claimed is:

1. A control apparatus for adjusting the stroke volume of at least one hydraulic unit as a function of the operating pressure, comprising pre-control means incorporating a pre-control valve unit including a pre-control piston means impinged by the measurement pressure and a first adjustable spring system, servo means cooperating with said pre-control means, said servo means incorporating at least one servo piston unit impacted by a regulated quantity of pressurized fluid medium delivered from said pre-control valve unit, an adjustment element provided for said hydraulic unit, said servo piston unit actuating said adjustment element, a second adjustable spring system acting upon said pre-control means and the operation of which is influenced by the position of said servo means at least one connecting element actuated by said servo means, said second adjustable spring system acting upon said pre-control piston means against the action of the force of said first spring system through the agency of said connecting element actuated by said servo means.

2. A control apparatus as defined in claim 1, wherein said second spring system includes at least two oppositely acting spring members.

3. A control apparatus for adjusting the stroke volume of at least one hydraulic unit as a function of the operating pressure, comprising pre-control means incorporating a pre-control valve unit including a pre-control piston means impinged by the measurement pressure and a first adjustable spring system, servo means cooperating with said pre-control means, said servo means incorporating at least one servo piston unit impacted by a regulated quantity of pressurized fluid medium delivered from said pre-control valve unit, an adjustment element provided for said hydraulic unit, said servo piston unit actuating said adjustment element, a second adjustable spring system acting upon said pre-control means and the operation of which is influenced by the position of said servo means, at least one connecting element actuated by said servo means, said second adjustable spring system acting upon said pre-control piston means against the action of the force of said first spring system through the agency of said connecting element actuated by said servo means, said apparatus further including a number of separate pressure systems, said measurement pressure acting upon said pre-control valve unit being formed from the sum of a number of operating pressures prevailing in said separate pressure systems and said servo means adjusting the adjustment element of each hydraulic unit associated with said pressure systems.

4. A control apparatus as defined in claim 1, wherein said servo means is provided with means which ensure that said servo means only adjusts said adjustment element when exceeding a boundary value.

5. A control apparatus as defined in claim 4, wherein said means provided for said servo means comprises an arm member fixedly connected with said servo means, said arm member being provided with stop members which define said boundary value and between which said adjustment element is freely adjustable.

6. A control apparatus as defined in claim 1, further including at least one transmission element through the agency of which there occurs the adjustment of said connecting element by said servo means.

7. A control apparatus for adjusting the stroke volume of at least one hydraulic unit as a function of the operating pressure, comprising pre-control means incorporating a pre-control valve unit including a pre-control piston means impinged by the measurement pressure and a first adjustable spring system, servo means cooperating with said pre-control means, said servo means incorporating at least one servo piston unit impacted by a regulated quantity of pressurized fluid medium delivered from said pre-control valve unit, an adjustment element provided for said hydraulic unit, said servo piston unit actuating said adjustment element, a second adjustable spring system acting upon said pre-control means and the operation of which is influenced by the position of said servo means, at least one connecting element actuated by said servo means, said second adjustable spring system acting upon said pre-control piston means against the action of the force of said first spring system through the agency of said connecting element actuated by said servo means, said apparatus further including at least two connecting elements, servo means and pre-control means, said second adjustable spring system acting upon said two connecting elements and each of said connecting elements being operably associated with a servo means and acting upon a pre-control means.

8. A control apparatus as defined in claim 1, wherein said second adjustable spring system incorporates at least two adjacently arranged spring members, said connecting element having an extension, one of said spring members acting upon said extension of said connecting element.

References Cited

UNITED STATES PATENTS

| 2,179,071 | 11/1939 | Weidmann | 103—38 |
| 2,606,423 | 8/1952 | Spencer | 103—38 X |
| 2,932,948 | 4/1960 | Neff et al. | 103—38 |
| 3,065,700 | 11/1962 | Blenkle | 103—162 X |
| 3,163,115 | 12/1964 | Neff et al. | 103—38 |
| 3,254,604 | 6/1966 | Faisandies | 103—37 |
| 3,407,738 | 10/1968 | Bosch | 103—38 X |
| 3,434,427 | 3/1969 | Smith et al. | 103—38 |

WILLIAM L. FREEH, Primary Examiner

U.S. Cl. X.R.

103—162